US006256214B1

(12) United States Patent
Farrington et al.

(10) Patent No.: US 6,256,214 B1
(45) Date of Patent: Jul. 3, 2001

(54) GENERAL SELF-DRIVEN SYNCHRONOUS RECTIFICATION SCHEME FOR SYNCHRONOUS RECTIFIERS HAVING A FLOATING GATE

(75) Inventors: Richard W. Farrington, Heath; William Hart, Plano, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/267,155

(22) Filed: Mar. 11, 1999

(51) Int. Cl.$^7$ .......................... H02M 7/217; H02M 3/335
(52) U.S. Cl. ............................. 363/127; 363/21
(58) Field of Search .................. 363/18–21, 89, 363/97, 125, 127

(56) References Cited

U.S. PATENT DOCUMENTS

| 5,274,543 | 12/1993 | Loftus, Jr. et al. ............ 363/127 |
| 5,590,032 | 12/1996 | Bowman et al. ............ 363/15 |
| 5,625,541 | 4/1997 | Rozman ............ 363/21 |
| 5,663,877 | 9/1997 | Dittli et al. ............ 363/127 |
| 5,774,350 | * 6/1998 | Notaro et al. ............ 363/89 |
| 5,781,420 | 7/1998 | Xia et al. ............ 363/21 |
| 5,818,704 | * 10/1998 | Martinez ............ 363/21 |
| 5,870,299 | 2/1999 | Rozman ............ 363/127 |
| 5,872,705 | * 2/1999 | Loftus, Jr. et al. ............ 363/21 |
| 5,886,881 | * 3/1999 | Xia et al. ............ 363/21 |

OTHER PUBLICATIONS

Tabisz, W., Lee, F.C., Chen, D., "A MOSFET Resonant Synchronous Rectifier for High Frequency DC/DC Converters", IEEE PESC Aug. 1990 Proceedings, pp. 769–779.
Jitaru, I.D., "Constant Frequency, Forward Converter with Resonant Transitions", HFPC Jun. 1991 Proceedings, pp. 282–292.
Cobos, J.A., et al., "Several Alternatives for Low Output Voltage on Board Converters", IEEE APEC Sep. 1998 Proceedings, pp. 163–169.
Murakami, N., et al., "A Highly Efficient, Low–profile 300 W Power Pack for Telecommunications Systems", IEEE APEC May 1994 Proceedings, pp. 786–792.
Djekic, O., Brkovic, M., "Synchronous Rectifier vs. Shottky Diodes in a Buck Topology for Low Voltage Applications", IEEE PESC May 1997 Proceedings, pp. 1374–1380.
Nakayashiki, et al., "High–Efficiency Switching Power Supply Unit with Synchronous Rectifier", IEEE INTELEC Mar. 1998 Proceedings, pp. 398–403.

* cited by examiner

Primary Examiner—Matthew Nguyen
(74) Attorney, Agent, or Firm—Arthur I. Navarro

(57) ABSTRACT

A self-driven synchronous rectifier circuit having synchronous rectifiers with floating gates for a power converter or signal transformer. The circuit comprises a transformer (49, 70) having a secondary winding with a first and second terminal, a first synchronous rectifier (SQ1) coupled to the first transformer secondary winding first terminal and having a control terminal floating relative to ground and a first drive circuit coupled to the first synchronous rectifier floating control terminal and controlling the first synchronous rectifier. A first control signal is coupled to the first drive circuit, where the first control signal controls the first drive circuit as a function of a polarity reversal of a voltage across the first transformer (49, 70). A second synchronous rectifier (SQ2) is coupled to the first transformer secondary winding second terminal and has a control terminal floating relative to ground. A second drive circuit is coupled to the second synchronous rectifier floating control terminal and controls the second synchronous rectifier. A second control signal is coupled to the second drive circuit, where the second control signal controls the second drive circuit as a function of a polarity reversal of a voltage across the first transformer (49, 70).

29 Claims, 8 Drawing Sheets

US 6,256,214 B1

GENERAL SELF-DRIVEN SYNCHRONOUS RECTIFICATION SCHEME FOR SYNCHRONOUS RECTIFIERS HAVING A FLOATING GATE

CROSS-REFERENCE TO RELATED APPLICATIONS

The following U.S. Patent Application is commonly assigned and is incorporated herein by reference:

| Patent No. | Ser. No. | Inventor | Title |
|---|---|---|---|
| 6,038,148 | 09/209,733 | Farrington, et al. | Self-Driven Synchronous Rectification Scheme |

TECHNICAL FIELD

This invention relates generally to power converter circuits, and more particularly to self-driven synchronous rectifiers easily adapted to all types of circuit topologies.

BACKGROUND OF THE INVENTION

As logic integrated circuits (ICs) have migrated to lower working voltages in the search for lower power consumption and higher operating frequencies, and as overall system sizes have continued to decrease, power supply designs with smaller size and higher efficiency are in demand. In an effort to improve efficiencies and increase power densities, synchronous rectification has become necessary for these type of applications. Synchronous rectification refers to using active devices such as the MOSFET as a replacement for Schottky diodes as rectifier elements in circuits to reduce conduction power losses in the secondary rectifiers. Recently, self-driven synchronous schemes have been widely adopted in the industry as the desired method for driving the synchronous rectifiers in DC/DC modules for output voltages of 5 volts and below. Self-driven synchronous schemes provide a simple, cost effective and reliable method of implementing synchronous rectification.

Most of these schemes are designed to be used with a very particular set of topologies commonly known as "D, 1-D" (complementary driven) type topologies. See Cobos, J. A., et al., "Several alternatives for low output voltage on board converters", IEEE APEC 98 Proceedings, at pp. 163–169. See also U.S. Pat. No. 5,590,032 issued on Dec. 31, 1996 to Bowman et al. for a Self-synchronized Drive Circuit for a Synchronous Rectifier in a Clamped-Mode Power Converter, and U.S. Pat. No. 5,274,543 issued on Dec. 28, 1993 to Loftus entitled Zero-voltage Switching Power Converter with Lossless Synchronous Rectifier Gate Drive. In these types of converters, the gate of the devices is referenced to ground, and the power transformer signal in the secondary winding has the correct shape and timing to directly drive the synchronous rectifiers with minimum effort. Furthermore, the rectifier is configured to insure the synchronous rectifier gate signals do not float relative to secondary ground and are easy to drive. FIG. 1 shows an example of this family of converters, with an active clamp forward circuit 10 and self-driven synchronous rectification provided by synchronous rectification circuitry 12 comprising two synchronous rectifiers SQ1 and SQ2 coupled between the secondary winding of the transformer 18 and the output, $V_{out}$. As shown in FIG. 2, the transformer signal 20 for these types of converters has a square shape with two very recognizable intervals, each corresponding to the "on" time of one of the synchronous rectifiers SQ1 and SQ2.

In topologies such as the hard-switched half-bridge (HB), the full-bridge (FB) rectifiers, and the push-pull topologies and non-"D, 1-D" type topologies (e.g. clamp forward with passive reset), the transformer voltage has a recognizable zero voltage interval, making it undesirable to implement self-driven synchronous rectification. As a result, it is necessary to use an external drive circuit with these circuit topologies. Changing the placement of the synchronous rectifiers relative to the transformer to simplify the driving scheme may result in a floating transformer winding with respect to ground, which generally increases common mode current between the primary and secondary circuits, causing increased EMI noise. Rectifier circuits employing synchronous rectification generally are reconfigured away from the EMI-preferred configuration.

What is needed in the art is a circuit and method for providing synchronous rectification for the secondary side of a transformer that is suitable for use with a wide range of circuit topologies and has low EMI noise.

SUMMARY OF THE INVENTION

The present invention achieves technical advantages as a self-driven synchronous rectification scheme with synchronous rectifiers having a floating gate. The scheme may be easily adapted to all type of topologies, including hard-switched HB, FB and push-pull converters, for which no efficient self-driven synchronous rectification scheme was previously available.

The present invention is a self-driven synchronous rectifier circuit for a power converter, the circuit including a first transformer having a primary winding and a secondary winding, the secondary winding having a first terminal and a second terminal. A first synchronous rectifier is coupled to the first transformer secondary winding first terminal and has a control terminal floating relative to ground. A first drive circuit is coupled to the first synchronous rectifier floating control terminal and controls the first synchronous rectifier. A first control signal is coupled to the first drive circuit, wherein the first control signal controls the first drive circuit as a function of a voltage polarity reversal across the first transformer. The first control signal may be a signal from the first transformer secondary winding second terminal, or may be a signal from a second transformer secondary winding terminal of a signal transformer.

The circuit may also further include a second synchronous rectifier coupled to the first transformer secondary winding second terminal having a control terminal floating relative to ground, and a second drive circuit coupled to the second synchronous rectifier floating control terminal and controlling the second synchronous rectifier. A second control signal may be coupled to the second drive circuit, wherein the second control signal controls the second drive circuit as a function of a voltage polarity reversal across the first transformer. The first drive circuit may include a first switch and a second switch in a totem pole arrangement, and the second drive circuit may include a third switch and a fourth switch in a totem pole arrangement, where the switches are MOSFETs.

Also disclosed is a method of rectifying a varying voltage from a power converter using a self-driven synchronous rectifier circuit with a first transformer having a primary winding and a secondary winding, where the secondary winding has a first and second terminal. The method includes the steps of providing a varying signal to the primary winding of the first transformer, and a first synchronous rectifier having a control terminal conducting current via the first transformer secondary winding, where the control terminal floats relative to ground. A first drive circuit controls the first synchronous rectifier, and a first control signal controls the first drive circuit as a function of a voltage polarity reversal across the first transformer. A second synchronous rectifier having a control terminal conducts current via the first transformer secondary winding, and the control terminal floats relative to ground. A second drive circuit controls the second synchronous rectifier, and a second control signal controls the second drive circuit as a function of a voltage polarity reversal across the first transformer.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The following is a description of the structure and method of the present invention. Prior art circuits will be discussed first, followed by a description of several preferred embodiments and alternatives of the present invention, and a discussion of the advantages.

Figure 1:
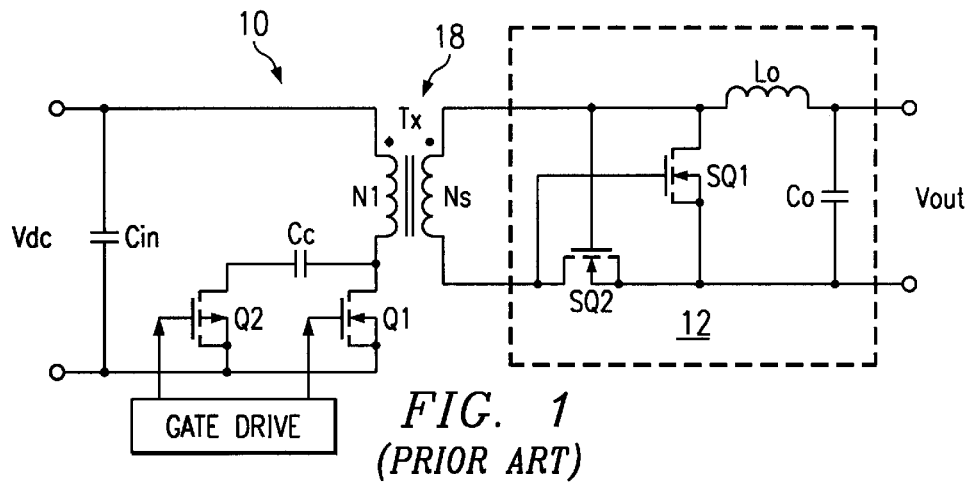
FIG. 1 illustrates a prior art active clamp forward converter with self-driven synchronous rectification.
Figure 2:
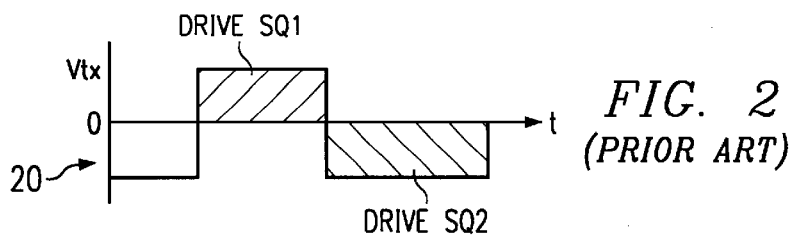
FIG. 2 illustrates typical transformer voltages for a "D, 1-D" type converter shown in FIG. 1.

The prior art synchronous rectifier shown in FIG. 1 is undesirable for use with some circuit topologies, such as the hard-switched half-bridge (HB), the full-bridge (FB) rectifiers, and the push-pull topologies and non-"D, 1-D" type topologies (e.g. clamp forward with passive reset). The transformer voltage has a recognizable zero voltage interval, making it undesirable to implement self-driven synchronous rectification. As a result, it is necessary to use an external drive circuit with these circuit topologies. In addition, a dissipative snubber is usually required, to limit the voltage stress across the synchronous rectifiers and dampen voltage oscillation.

Furthermore, using the transformer voltage to drive the synchronous rectifiers for these circuit topologies results in conduction of the parasitic anti-parallel diode of the MOSFETs used for synchronous rectifiers SQ1 and SQ2 for a significant portion of the freewheeling interval, negatively affecting the efficiency of the module, which is undesired. Some self-driven implementations for the resonant reset forward have been reported. See Murakami, N. et al., "A Highly Efficient, Low-profile 300 W Power Pack for Telecommunications Systems", IEEE APEC 1994 Proceedings, at pp. 786–792 and Yamashita, N. et al., "A Compact, Highly Efficient 50 W On Board Power Supply Module for Telecommunications Systems", IEEE APEC 1995 Proceedings, at pp. 297–302. In these implementations, the resonant reset interval has been adjusted to provide the correct gate-drive signal during the freewheeling interval. In another design, an implementation of self-driven rectification is shown for a two-switch forward converter. See Nakayashiki, Y. et al., "High-Efficiency Switching Power Supply Unit with Synchronous Rectifier," IEEE INTELEC 1998 Proceedings, at pp. 398–403.

Changing the placement of the synchronous rectifiers of the prior art circuit of FIG. 1 so they are referenced to ground, using the transformer signal to directly drive the synchronous rectifiers, is disadvantageous, because the transformer winding then floats with respect to ground. Generally, a rectifier with a floating transformer generates increased common mode currents between the primary and secondary circuits, which results in increased ElectroMagnetic Interference (EMI). The preferred, EMI quiet, secondary side circuit configuration requires that at least one of the synchronous rectifiers have a gate drive signal that floats relative to ground. This generally increases the complexity of the driving circuitry.

Figure 3A:
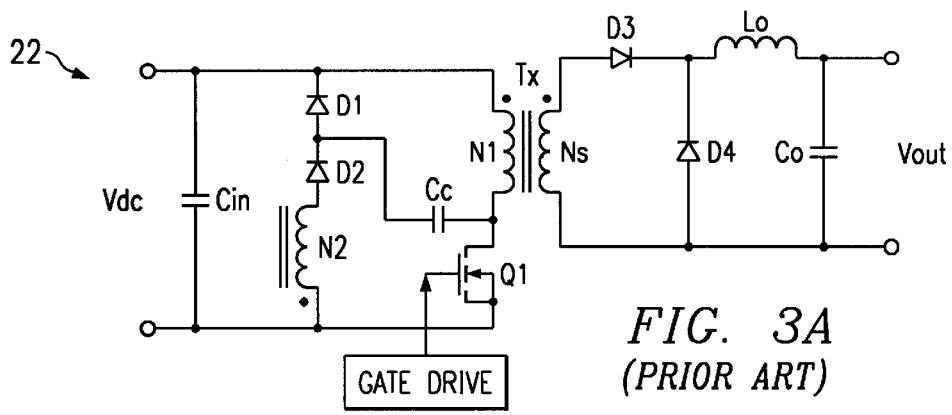
FIG. 3A shows a prior art clamp forward circuit with passive reset.
Figure 3B:
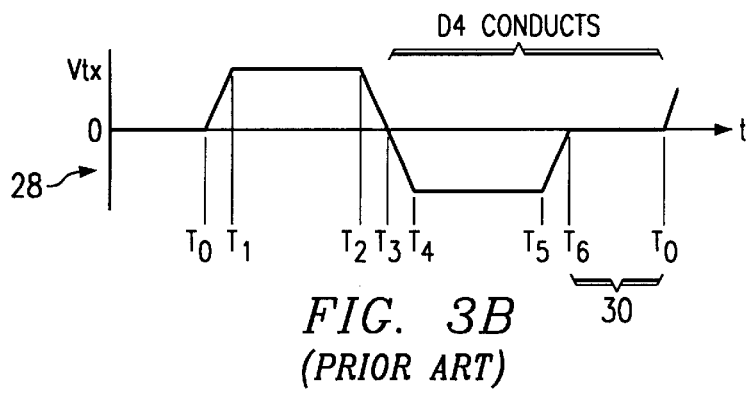
FIG. 3B shows typical secondary transformer voltage waveforms for the prior art circuit shown in FIG. 3A.

FIG. 3A shows a prior art clamp forward circuit 22 with passive reset and FIG. 3B shows the associated typical secondary transformer voltage waveform 28. If traditional self-driven synchronous schemes are used with this topology, it can be shown that the synchronous rectifier which conducts during the freewheeling stage will turn off before this stage ends in time period 30. In this case the anti-parallel diode of the MOSFET conducts, increasing the losses. In order to obtain high efficiency, it is necessary for this MOSFET to conduct during the entire freewheeling stage. Furthermore, without rearranging the configuration of the secondary circuit, a floating gate drive would be needed to drive the synchronous rectifier replacing diode D3.

Traditional self-driven synchronous rectifier schemes use the voltage developed by the transformer to turn-on the corresponding synchronous rectifier, and when this voltage decays to zero, the synchronous rectifier is turned off. However, rectifiers (diodes) do not operate in this manner. Generally, diodes require voltage of the opposite polarity to turn off. Therefore, traditional driving schemes provide a practical solution in a limited number of circuit configurations.

Figure 4:
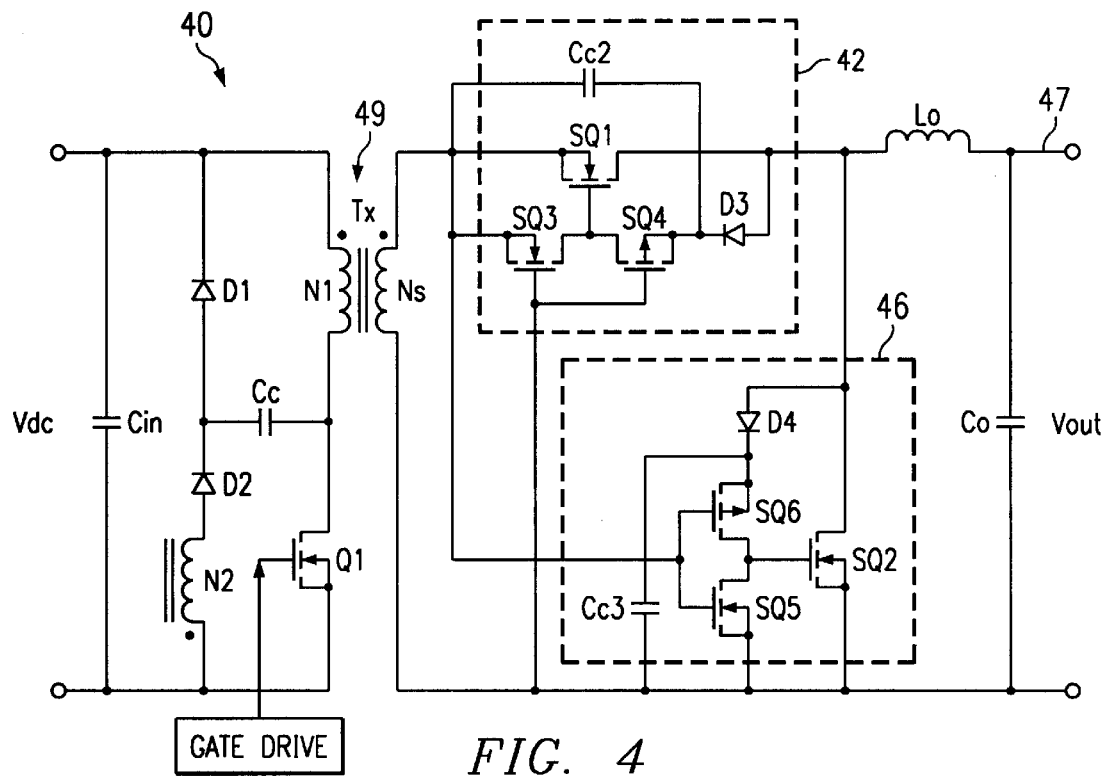
FIG. 4 illustrates a clamp forward circuit with passive reset utilizing a first embodiment of the present invention.

The present invention achieves technical advantages as a self-driven synchronous rectifying scheme utilizing the same principles as a silicon diode and may be easily implemented in all types of circuit topologies configurations. The present invention is a synchronous rectifier scheme 40 with synchronous rectifiers SQ1 and SQ2 having gates that float relative to ground, as shown in a first embodiment in FIG. 4. Transformer 49 has a primary winding and a secondary winding. Circuit 42 is coupled to a first end of the transformer 49 secondary winding and comprises two small switches SQ3 and SQ4 coupled to the gate of the synchronous rectifier SQ1. Circuit 42 also includes a floating supply voltage comprised of Cc2 and D3. Likewise for circuit 46, two small switches SQ5 and SQ6 are coupled to the gate of synchronous rectifier SQ2. Circuit 46 also includes a floating supply voltage comprised of Cc3 and D4. Preferably, an inductor $L_0$ is coupled in series between the circuit 46 and an output voltage terminal 47 to smooth current ripples, and a capacitor $C_0$ is coupled across the rails to smooth the voltage, as shown.

Synchronous rectifiers SQ1 and SQ2 and switches SQ3, SQ4, SQ5 and SQ6 preferably comprise Field Effect Transistors (FETs), and more preferably comprise Metal Oxide Semiconductor FETs (MOSFETs), with the switch MOSFETs SQ3, SQ4, SQ5 and SQ6 being smaller than the synchronous rectifier MOSFETs SQ1 and SQ2. The two smaller switches SQ3, SQ4, and SQ5, SQ6, for each synchronous rectifier SQ1 and SQ2, respectively, form first and second totem-pole drive circuits that each float relative to ground, and are adapted to control the respective synchronous rectifiers SQ1 and SQ2. In particular, in accordance with the present invention, the gates of the synchronous rectifiers SQ1 and SQ2 float relative to ground. Preferably, switches SQ3 and SQ5 are N-type MOSFETs, and switches SQ4 and SQ6 are P-type FETs.

A first control signal derived from the second terminal of the transformer 49 secondary winding controls the first drive circuit as a function of a polarity reversal of a voltage across the transformer 49. A second control signal derived from the first terminal of the transformer secondary winding controls the second drive circuit as a function of a polarity reversal of a voltage across the transformer 49. In this driving scheme, the synchronous rectifiers SQ1 and SQ2 are not turned off when the transformer signal vanishes to zero as in the traditional self-driven scheme, but rather, are turned off when the transformer voltage switches polarity. The synchronous rectifiers SQ1 and SQ2 remain on and conduct when the transformer signal vanishes to zero, in contrast to the traditional self-driven schemes of the prior art. According to the present invention, synchronous rectifiers SQ1 and SQ2 are turned off when the transformer voltage switches polarity. Synchronous rectifiers SQ1 and SQ2 are turned on through their respective totem-pole drive circuit, and are turned off when the transformer voltage switches polarity through the respective totem-pole drive circuit.

Capacitors Cc1 and Cc2 and diodes D3 and D4 generate the floating supply voltages needed to drive SQ1 and SQ2. By implementing the floating supply voltages in this manner, an additional advantage is achieved in that diode D3 and capacitor Cc1 clamps the voltage across synchronous rectifier SQ1, and diode D4 and capacitor Cc2 clamps the voltage across synchronous rectifier SQ2. Capacitors Cc1 and Cc2 limit the voltage stress across the synchronous rectifiers to approximately twice the input voltage reflected into the secondary side (~2*Vin*Ns/N1).

Generally, the interaction of the output capacitance of the synchronous rectifiers and the leakage inductance of the transformer result in increased voltage stress across the rectifiers. This increased voltage stress limits the type of devices that can be used for the synchronous rectifiers. In order to take full advantage of synchronous rectification, devices with the lowest possible Rds(on) are preferably used. Semiconductor physics dictate that lower voltage-rated devices typically have lower Rds(on). Therefore, it is important to minimize the increased voltage stress due to the interaction of circuit parasitics. The present invention minimizes the effect of these parasitic effects by clamping the voltage stress across the synchronous rectifiers with a capacitor that has a value much larger than the output capacitance of these devices. The energy stored in the clamp capacitors Cc2 and Cc3 is used in the present circuit to drive the synchronous rectifiers SQ1 and SQ2, respectively.

Figure 5:
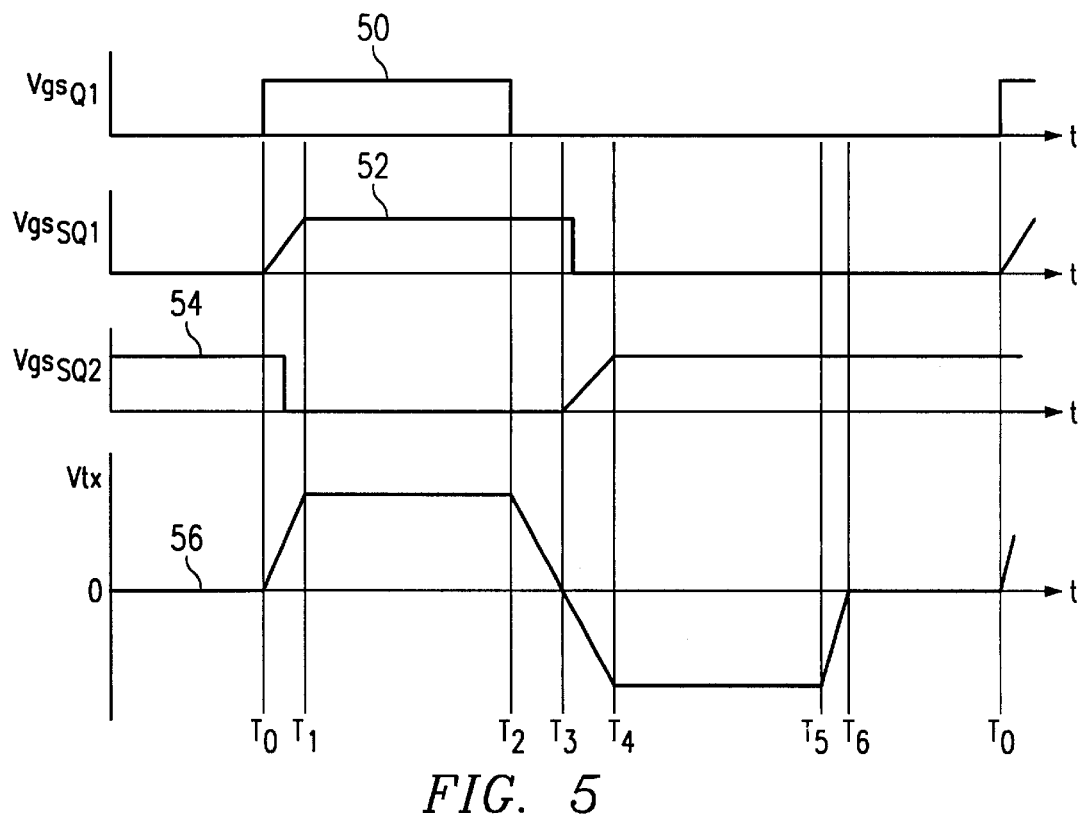
FIG. 5 shows voltage waveforms of the self-driven synchronous rectifier circuit of the first embodiment of the present invention for a clamp forward circuit with passive reset of FIG. 4.

At first glance, this self-driven synchronous rectifying scheme may seem to have a fundamental flaw. Referring to the waveforms in FIG. 5, at time $T<t_0$ rectifier SQ1 is off (signal 52) and rectifier SQ2 is conducting (signal 54). The transformer voltage is shown at signal 56. At time $T=t_0$ the primary switch Q1 turns on (signal 50) and tries to initiate a new switching cycle. Assuming an ideal transformer 49 (no leakage inductance and no series resistance) and the absence of all parasitics in the secondary circuit, the primary switch Q1 turns on into a short circuit. The sequence is as follows: at the time when the primary switch Q1 turns on, the anti-parallel diode of rectifier SQ1 instantaneously tries to conduct with rectifier SQ2 still on, resulting in a short formed across the secondary winding of the transformer 49. Rectifier SQ2 needs the voltage of the transformer 49 to reverse polarity in order to turn off, but this voltage cannot reverse before rectifier SQ2 turns off. However, this concept assumes ideal components and circuit layout. Therefore, if stray inductances and resistances are incorporated into the discussion it can be easily shown (experimentally and by simulation) that at switching frequencies of several kilohertz, the stray inductances and resistances found on a typical converter layout allow enough voltage to develop in the secondary to turn off rectifier SQ2. Rectifier SQ1 turns on into a momentary "short circuit".

The driving scheme of the present invention results in "shoot through" currents (peak currents due to a short circuit) during switching transitions, which may be compensated for, as will be described herein. For the current levels and switching frequencies most board-mounted power modules are designed for, these shoot through currents are not severe. The shoot through currents result from turning on the synchronous rectifiers SQ1 and SQ2 "late", and are less severe than the shoot through currents developed due to the reverse recovery effect intrinsic to all synchronous rectifiers when their parasitic anti-parallel diode is allowed to conduct, as is the case in traditional self-driven synchronous schemes. The parasitic anti-parallel diodes of the MOSFETs used for synchronous rectifiers SQ1 and SQ2 are very slow and do not turn off fast enough in this type of application: therefore, shoot-through currents are generated. These currents can be very severe, particularly at full load, compromising the performance of the module. It is recognized that one of the effects that prevents synchronous rectification from being used at higher switching frequencies (>500 kHz) is the loss resulting from reverse recovery in the synchronous rectifiers SQ1 and SQ2.

Figure 6:
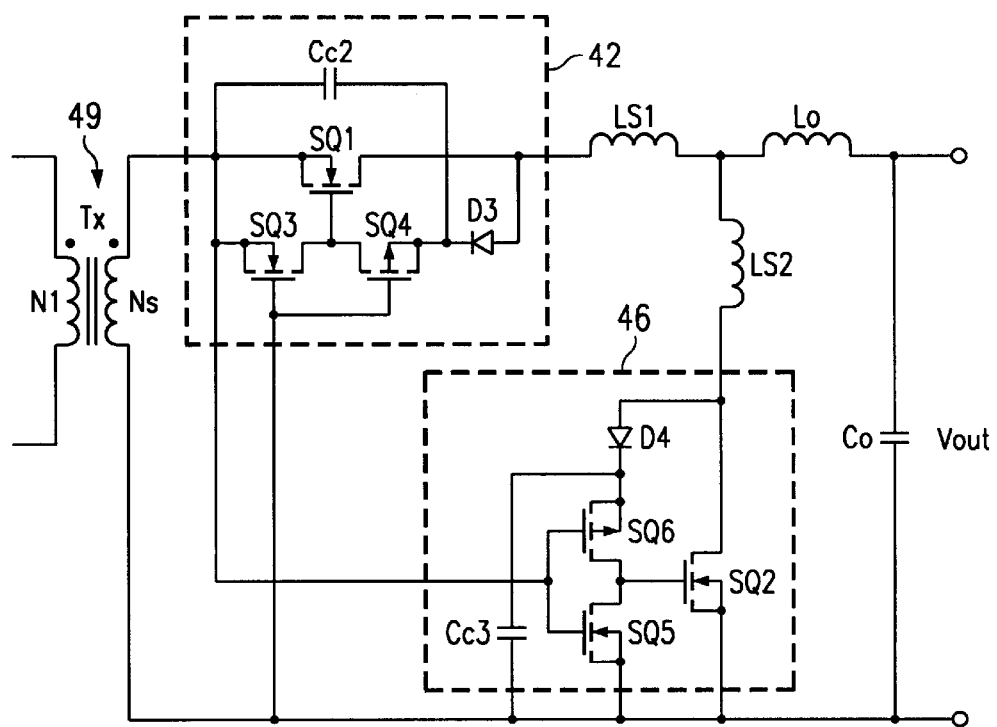
FIG. 6 shows a second embodiment in use with a half-wave rectifier with the present invention and external inductors.

If shoot through currents interfere with the normal operation of the circuit, optional external inductor LS1 and/or LS2 may be added in series with synchronous rectifiers SQ1 and/or SQ2, respectively, and $L_O$, as shown in a second embodiment of the present invention in FIG. 6. These external inductors LS1 and LS2 are preferably one-turn ferrite inductors that are allowed to saturate, or a more typical saturable inductor having square loop material. Using a saturable inductor minimizes the effect of the inductor on the overall performance of the circuit while eliminating shoot-through currents. Only one of the two inductors LS1 and LS2 is required to limit the shoot through currents, because LS1 and LS2 are effectively in series during the switching transitions. Furthermore, these external inductors LS1 and LS2 are preferably placed in series with the clamping circuits Cc2 and D3, or Cc3 and D4, to avoid limiting the effectiveness of the clamping circuitry in reducing the voltage stress across the synchronous rectifiers SQ1 and SQ2.

Figure 7:
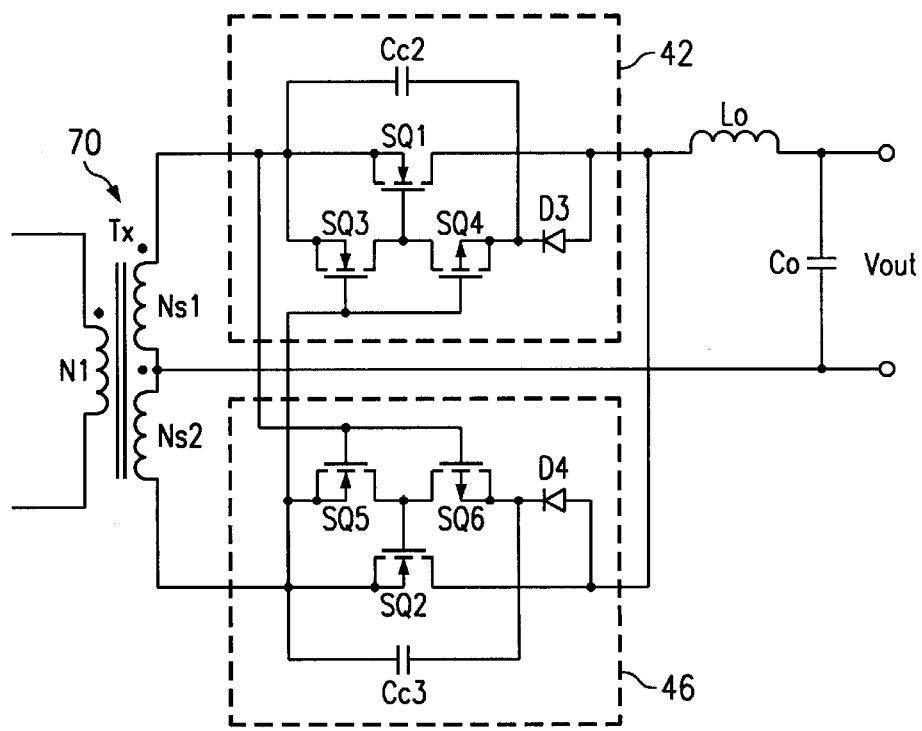
FIG. 7 illustrates a third embodiment of the present invention configured for a full-wave rectifier.

The implementation of the present invention for use with a full-wave rectifier is similar to that of the half-wave rectifier and is shown in a third embodiment in FIG. 7. The center tap of the transformer 70 is coupled to a return voltage terminal, with circuits 42 and 46 coupled to the transformer as described in FIG. 4. In the configuration shown for a full-wave rectifier, the maximum voltage stress seen from gate to source of the N-type FETs SQ3 and SQ5 is approximately equal to 2*Vin*Ns/N1. The voltage stress on the P-type FETs SQ4 and SQ6 is approximately equal to 4*Vin*Ns/N1. In order to reduce the voltage stress seen by the gate of the P-type FETs, the gate of these devices may be coupled to ground, Vo+, or the drain of the synchronous rectifiers SQ1 and SQ2, without changing the overall operation of the circuit, for example.

Figure 8:
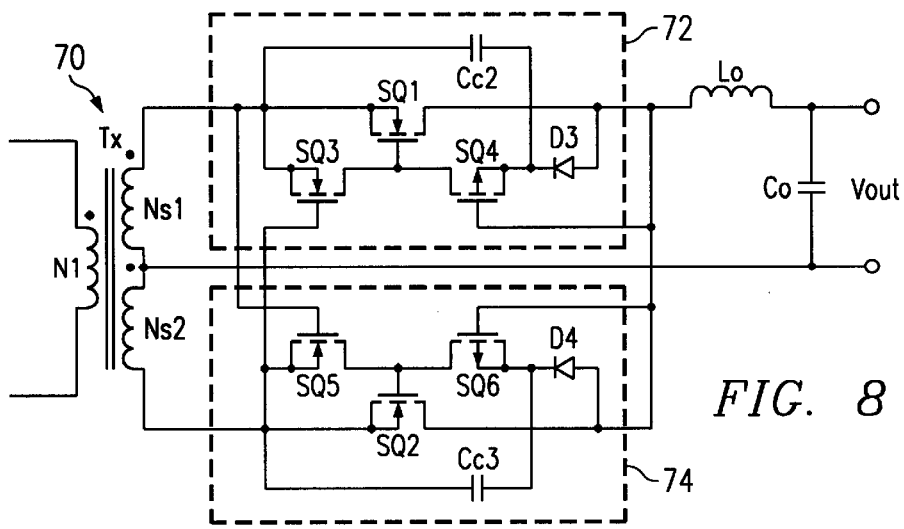
FIG. 8 shows a fourth embodiment of the present invention with a full-wave rectifier and alternative gate connections of the driving circuits.

Many alternatives and optional circuit elements are contemplated with the present invention, which may be implemented alone or in combination. FIG. 8 shows a fourth embodiment of the present invention and is an alternative to the full wave rectifier shown in FIG. 7. In this embodiment, the circuitry 72 and 74 are configured such that the gates of SQ4 and SQ6 are coupled to the inductor Lo rather than the gates of SQ3 and SQ4 as in circuitry 42 and 46 of previous embodiments. In this configuration, the maximum gate-source voltage stress seen by the P-FETs SQ4 and SQ6 is approximately equal to 2*Vin*Ns/N1.

Figure 9A:
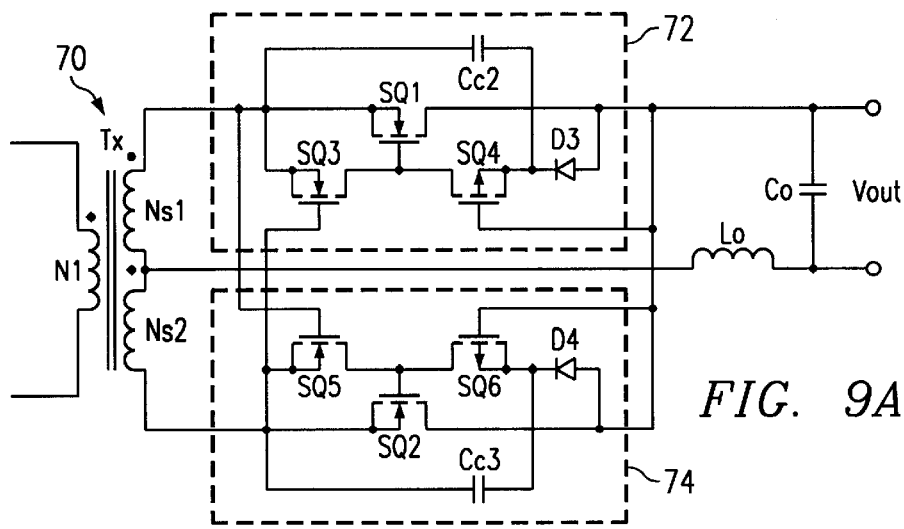
FIG. 9A illustrates a fifth embodiment of the present invention configured for a full wave rectifier, with an inductor coupled in series with the transformer second winding center tap and the output return voltage.
Figure 9B:
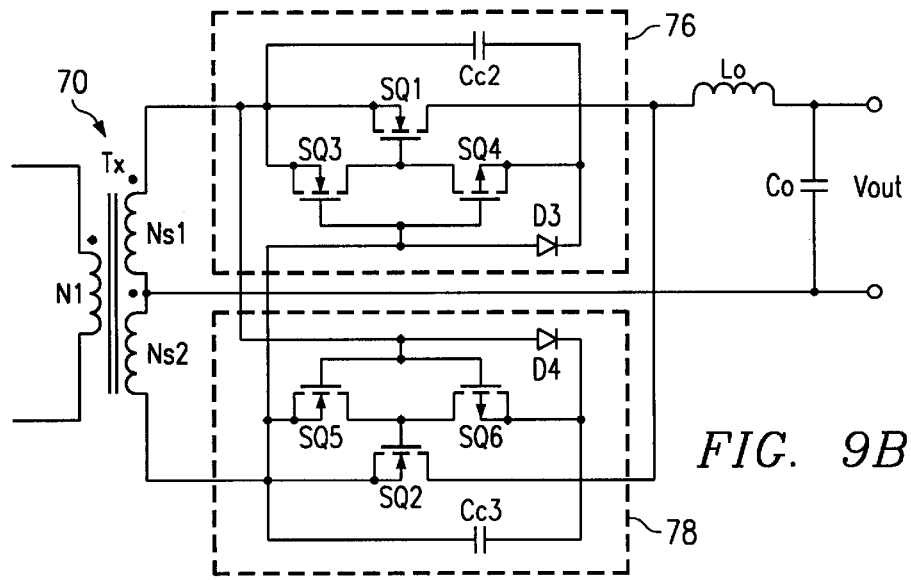
FIG. 9B illustrates a sixth embodiment of the present invention configured for a full wave rectifier, with an alternative configuration of the diodes across the drive circuits.

FIG. 9A illustrates a fifth embodiment, having circuitry 72 and 74, with inductor $L_O$ being connected between the center tap of the transformer 70 and the return voltage terminal of $V_{out}$. FIG. 9B shows a sixth embodiment, where the floating supply voltage for the synchronous rectifiers of circuitry 76 and 78 is generated by connecting capacitors Cc1 and Cc2 and diodes D3 and D4 directly across the transformer 70. However, in this configuration, the voltage stress across the synchronous rectifiers is not clamped as effectively as in the third embodiment shown in FIG. 7.

Figure 10A:
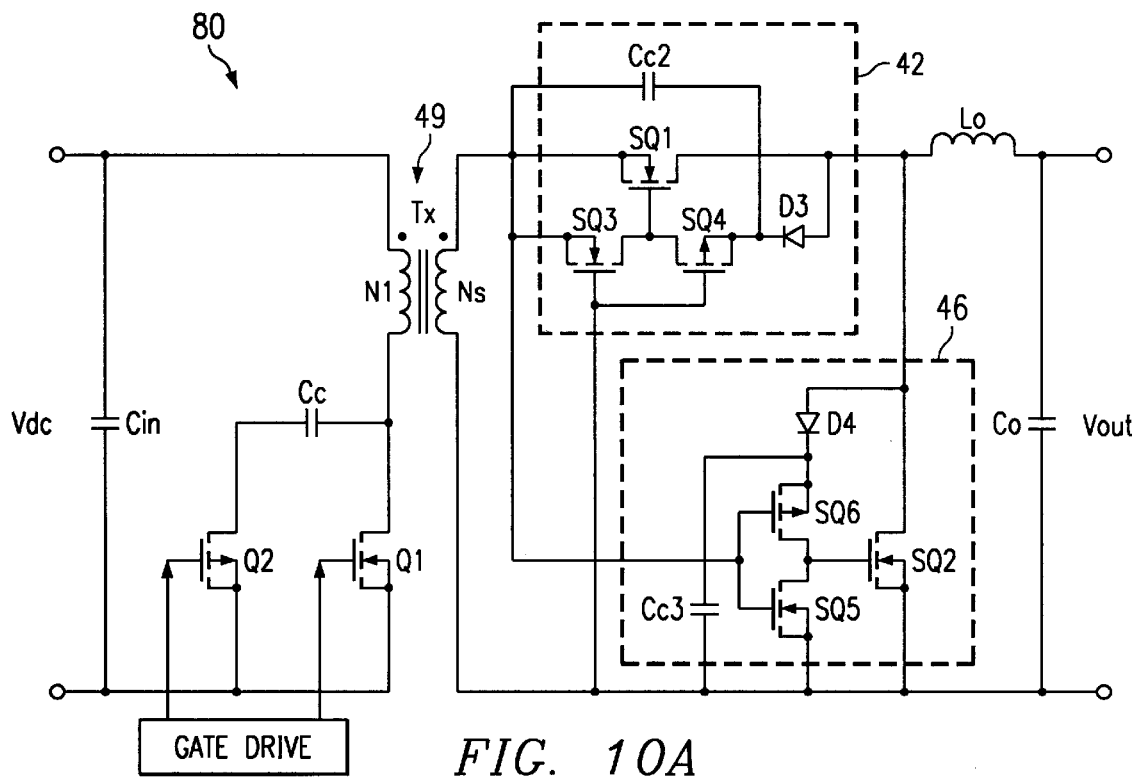
FIG. 10A shows a seventh embodiment of the present invention configured for an active clamp forward circuit.
Figure 10B:
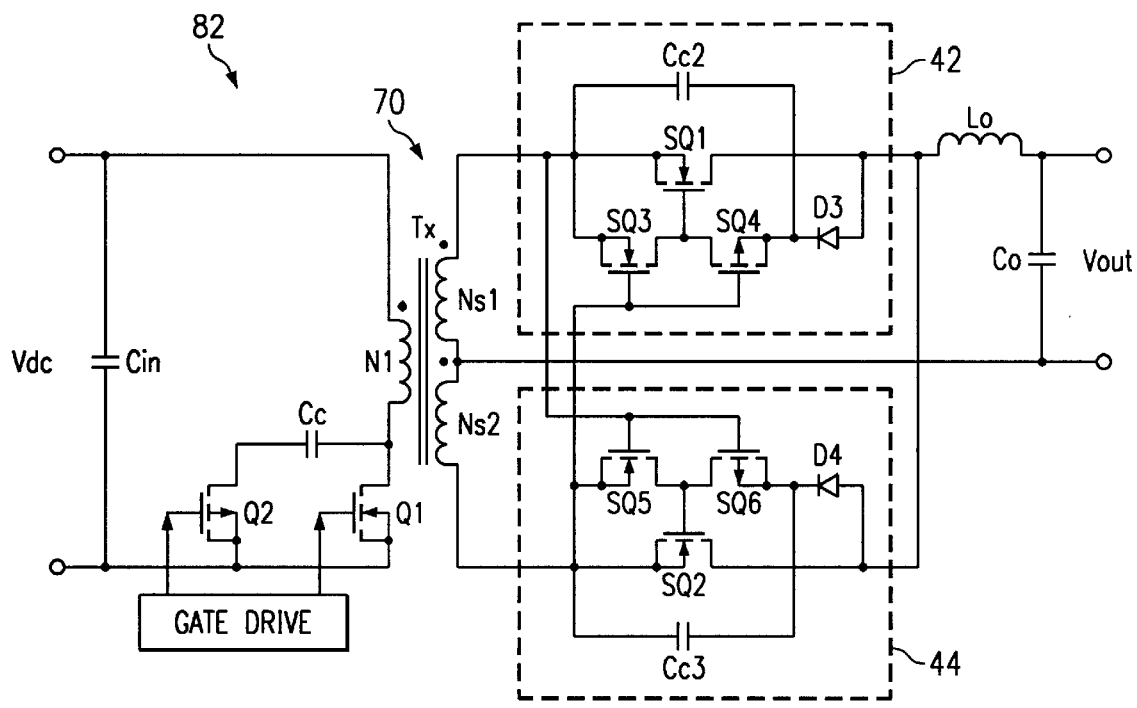
FIG. 10B shows an eighth embodiment of the present invention configured for an active clamp forward-flyback circuit.
Figure 11:
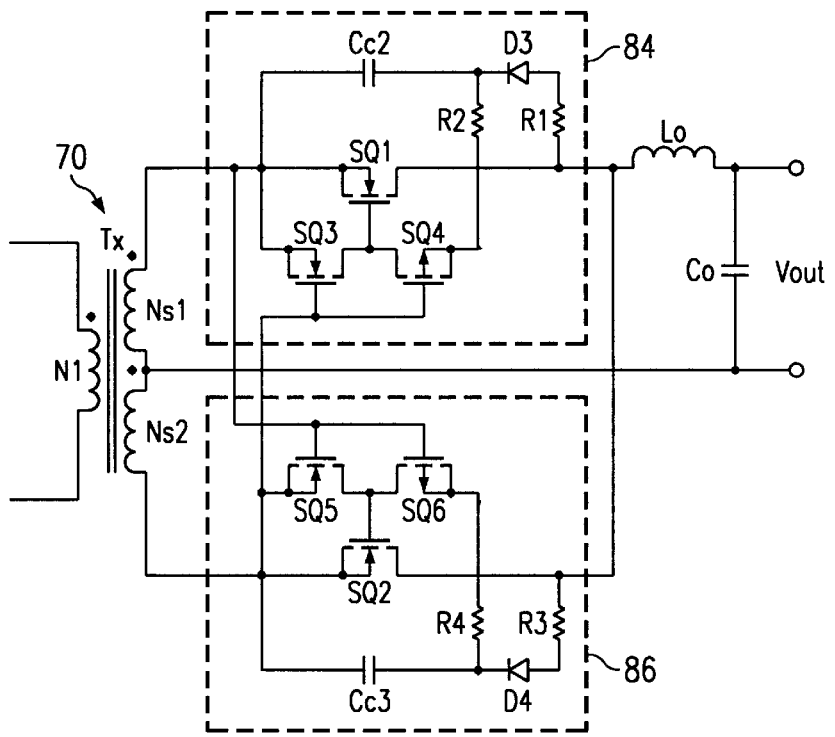
FIG. 11 illustrates a ninth embodiment of the present self-driven synchronous rectification scheme for a full-wave rectifier with optional current-limiting resistors.

FIG. 10A shows a seventh embodiment of the present invention implemented with an active clamp forward, and FIG. 10B shows an eighth embodiment implemented with an active clamp forward-flyback converter. If shoot-through currents in the gate drive are a concern, resistor R2 may be placed in series with switch SQ4, and resistor R4 may be placed in series with switch SQ6 to minimize this effect, as shown in a ninth embodiment in FIG. 11. Furthermore, if the primary circuit impedance is low enough, clamping capacitor Cc1 and Cc2 can generate excessive peak charging currents. In this case, a resistor R1 may be added in series with diode D3, and resistor R3 may be added in series with diode D4, as shown in FIG. 11. Reducing the value of the clamping capacitors also decreases the peak value of these charging currents.

Figure 12:
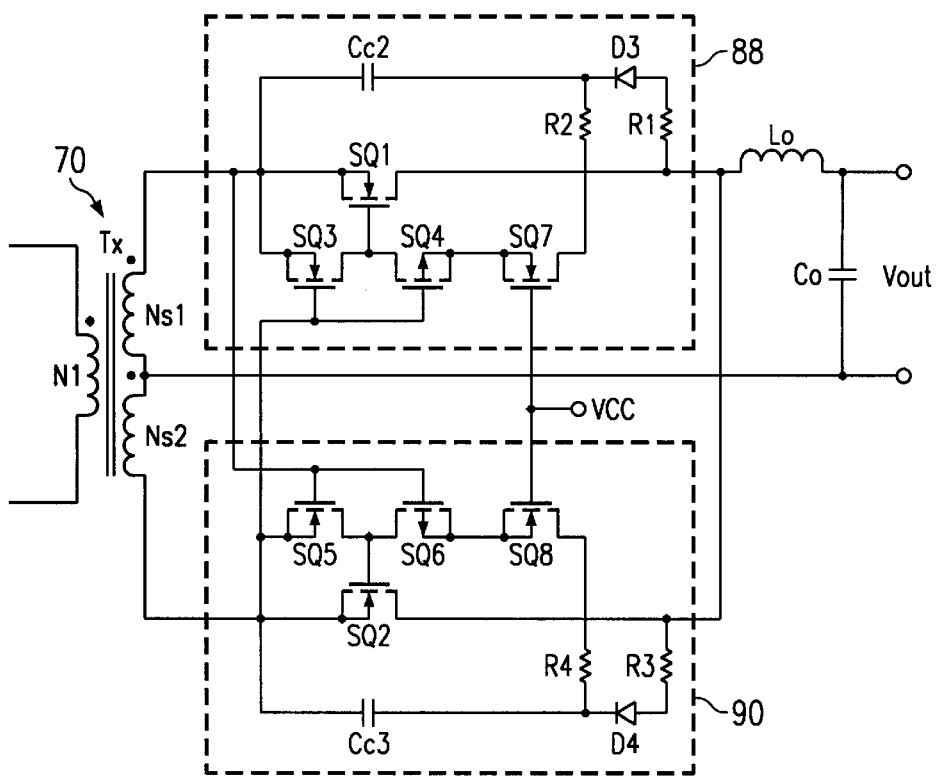
FIG. 12 shows a tenth embodiment of the present self-driven synchronous fullwave rectifier having optional gate voltage limiters.

In many applications it may be necessary to clamp the gate-drive signal to a predetermined value in order not to exceed the breakdown voltage of the gate, shown in the tenth embodiment of FIG. 12. Two N-type MOSFETs, SQ7 and SQ8, are added to circuits 88 and 90, respectively, to limit the voltage on the gate of the synchronous rectifiers to VCC minus a threshold voltage, for example, 1 to 2 volts.

Figure 13:
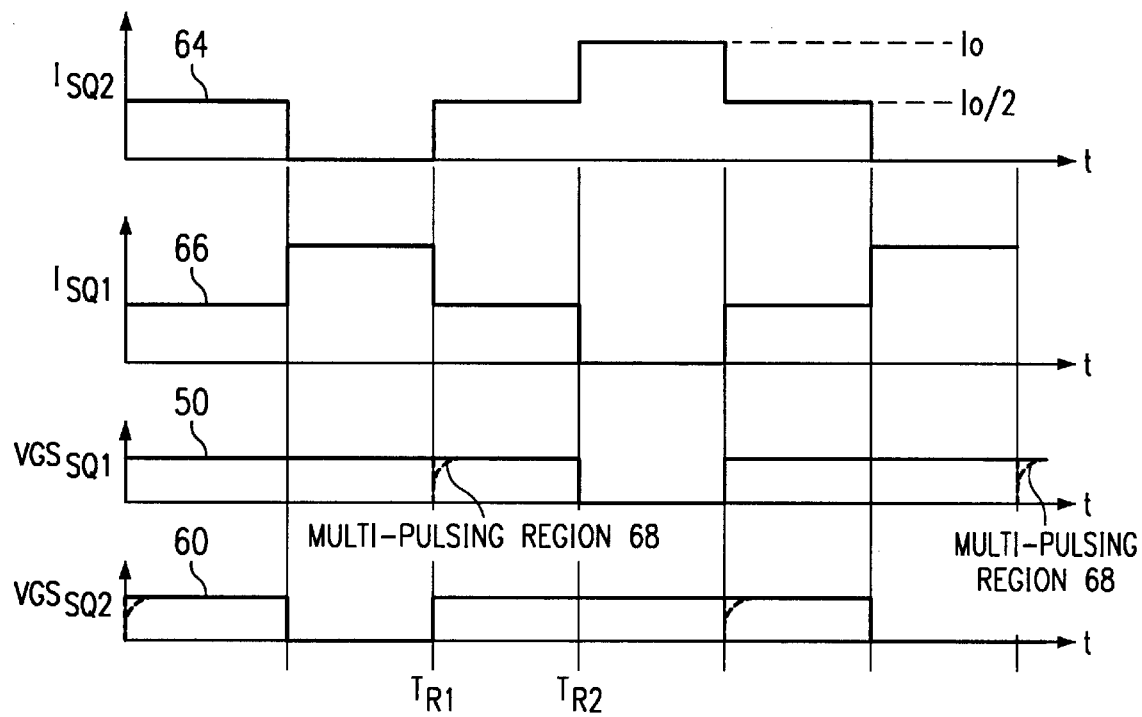
FIG. 13 shows synchronous rectifier current waveforms for hard-switched push-pull type topologies.

Implementing the present self-driven synchronous rectifier scheme for the hard switched half-bridge, full-bridge, and push-pull topologies may result in multiple pulsing by the gate-drive. In understanding this phenomena, note that the current $I_{SQ1}$ shown in FIG. 13 at signal 66 and $I_{SQ2}$ shown at signal 64 through the synchronous rectifiers SQ1 and SQ2 in these circuit topologies has a stair type shape, as shown in FIG. 13. Transitions $T_{R1}$ and $T_{R2}$ develop voltages in the parasitic inductances and resistances with the same polarity. The voltage that develops across these parasitic circuitry is what turns off switch SQ1 during transition $T_{R2}$. Therefore, the same phenomena will try to turn off SQ1 during transition $T_{R1}$, resulting in multi-pulsing of the gate-drive signal, shown in multi-pulsing region 68 of the voltage signal 50 for SQ1. The voltage of SQ2 is shown at signal 60.

Figure 14:
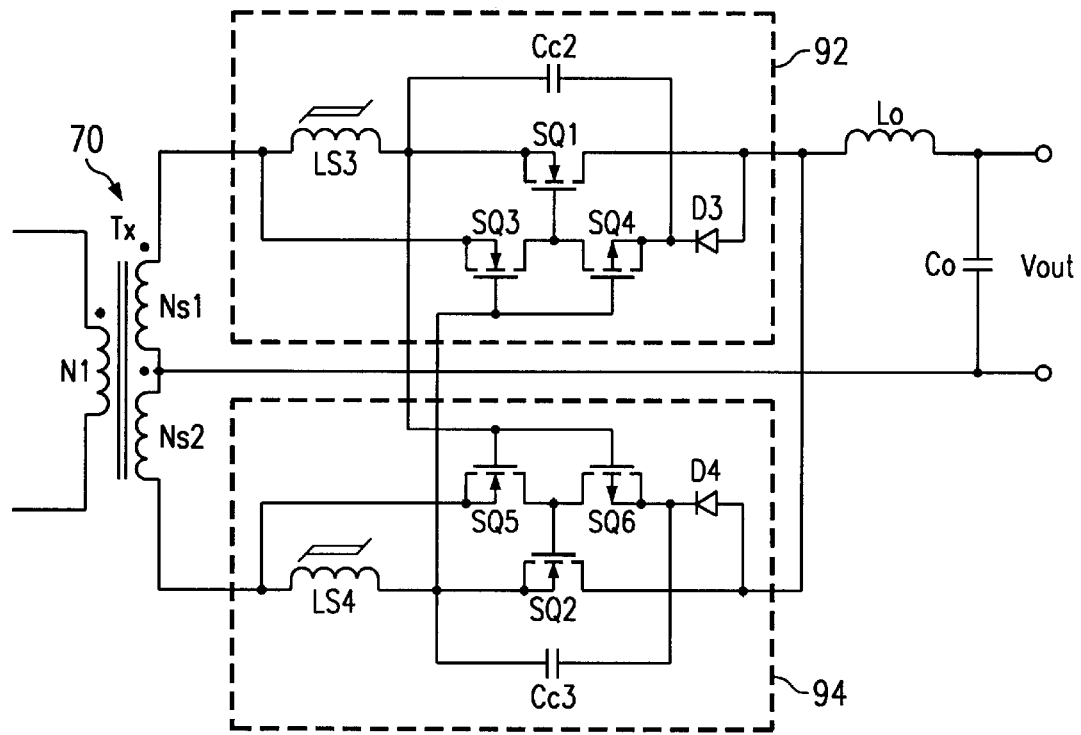
FIG. 14 shows an eleventh embodiment of the present invention with saturable inductors.
Figure 15:
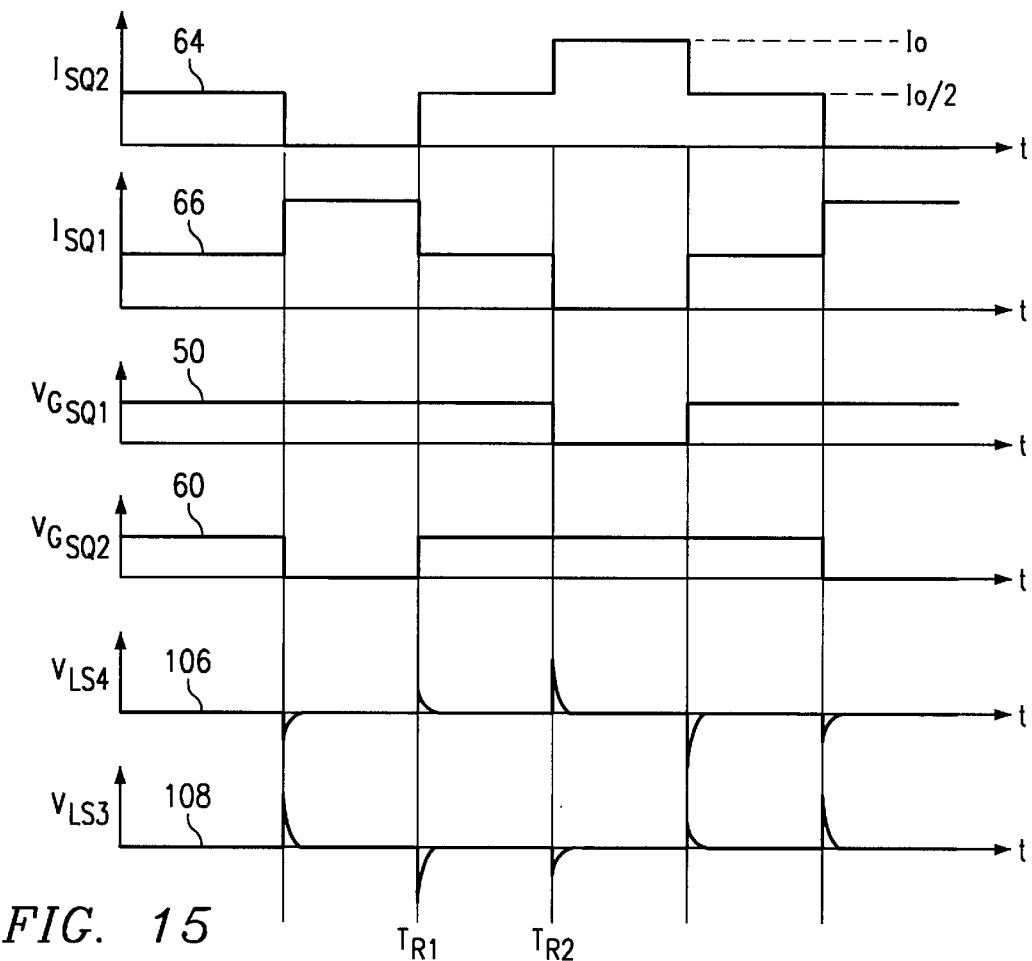
FIG. 15 illustrates waveforms for the eleventh embodiment having saturable inductors.

To minimize multi-pulsing, saturable inductors LS3 and LS4 may be added in series with the synchronous rectifiers SQ1 and SQ2 and the transformer 70, as shown in FIG. 14. If the saturable inductors LS3 and LS4 are assumed to have a square type material and their saturated inductance assumed to dominate the operation of the secondary circuit, then the waveforms representing the operation of the self-driven synchronous rectifier are as shown in FIG. 15, with the currents for SQ1 and SQ2 shown at signals 66 and 64, respectively, the voltages for SQ1 and SQ2 shown at signals 50 and 60, respectively, and the voltages for LS3 and LS4 shown at signals 108 and 106, respectively. It can be seen that considerably more voltage is developed at the gate of switch SQ3 during transition $T_{R2}$ than during transition $T_{R1}$, as is desired.

Figure 16:
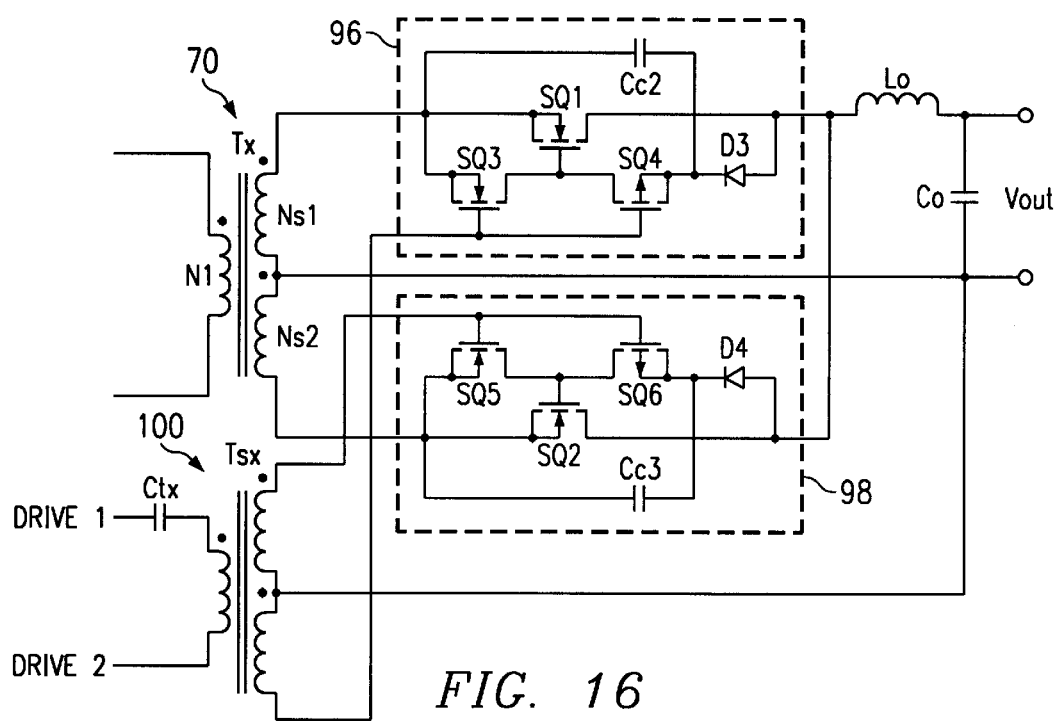
FIG. 16 shows a twelfth embodiment configured for use with a signal transformer.

Because the present synchronous rectifier drive circuitry uses the transformer voltage to drive the synchronous rectifiers, the driving signal may also be generated from a signal transformer, as shown in FIG. 16. Utilizing a signal transformer 100 would allow for adjustment of the timing between the turn-on and turn-off of the primary switches and synchronous rectifiers. An implementation of the present invention is shown with a push-pull type topology where Drive1 and Drive2, the drive for the primary switches, also drives the signal transformer 100. Circuitry 96 and 98 provide the synchronous rectification for the secondary side of the transformer 70. For the circuit shown in FIG. 16 to operate properly, the signal transformer 100 must be able to develop enough voltage to turn off the P-FET. If the signal transformer is referenced to ground, the maximum voltage developed by the transformer needs to be at least $3*Vin*Ns/N1$. The required voltage to properly drive the totem pole may be decreased by adding gate voltage limiting FETs SQ7 and SQ8, as previously discussed for FIG. 11.

The novel circuit and method of the present self-driven synchronous rectifier scheme with a floating synchronous rectifier gate is advantageous because it efficiently provides self-driven synchronous rectification for a power converter or signal transformer, where the synchronous rectifier continues to conduct when the voltage across the transformer secondary winding is approximately zero. The self-driven scheme of the present invention solves the reverse recovery problems found in prior art synchronous rectifier circuits. An additional advantage of the present synchronous self-driven scheme is that the additional switches SQ3, SQ4, SQ5 and SQ6 that serve as drive circuitry for the synchronous rectifiers SQ1 and SQ2 act as an active damper to the gate drive signal of SQ1 and SQ2, providing a buffer from the parasitic oscillations that normally appear in the secondary transformer winding due to the interactions of stray inductances and the output capacitance of the semiconductor devices. This eliminates the need for additional buffer components, usually required in the prior art. Several embodiments are depicted, illustrating the versatility of the present invention, which work well with a variety of circuit topologies. The present invention may be easily adapted to any type of converter topology.

The present invention also provides a means for limiting the voltage stress of the synchronous rectifiers SQ1 and SQ2 in a non-dissipative manner, eliminating the need for a dissipative snubber in the circuit design. The present invention also provides a quiet ElectroMagnetic Inteference (EMI) circuit. The need for an additional drive circuit is eliminated, required with some prior art topologies such as the hard-switched half-bridge (HB), full-bridge (FB) the push-pull topologies, and other non "D, 1-d" type topologies, e.g., clamp forward with passive reset.

A further advantage is that by generating the floating supply voltages with capacitors Cc1 and Cc2 and diodes D3 and D4 needed to drive SQ1 and SQ2, diode D3 and capacitor Cc1 clamp the voltage across synchronous rectifier SQ1, and diode D4 and capacitor Cc2 clamp the voltage across synchronous rectifier SQ2.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. The present invention has been described for use with a DC—DC power converter, but also derives technical advantages with other types of power converters such as AC—AC, for example.

The synchronous rectifiers SQ1 and SQ2, switches SQ3, SQ4, SQ5, and SQ6 and voltage drivers SQ7 and SQ8 are shown as MOSFETs; however, it is contemplated that another type of FET or switching device would be suitable for use in the present invention. Also, the gate-drive switches SQ3, SQ4, SQ5 and SQ6 are shown herein as connected at the output terminals of the transformer (49, 70) secondary winding. However, switches SQ3, SQ4, SQ5 and SQ6 may be tapped from any place in the transformer winding with the purpose of scaling the driving voltages. For example, for very low voltage applications, it might be necessary to extend the secondary transformer windings in order to boost the driving signal. Furthermore, this concept can be easily extended to the current doubler rectifier circuit as well as resonant type converters. It is therefore intended that the appended claims encompass any such modifications or embodiments.

What is claimed is:

1. A self-driven synchronous rectifier circuit for a power converter, said circuit comprising:

a first transformer having a primary winding and a secondary winding, said secondary winding having a first terminal and a second terminal;

a first synchronous rectifier coupled to said first transformer secondary winding first terminal and having a control terminal floating relative to ground;

a first drive circuit coupled to said first synchronous rectifier floating control terminal and controlling said first synchronous rectifier;

a first control signal coupled to said first drive circuit, wherein said first control signal controls the first drive circuit as a function of a voltage polarity reversal across said first transformer, wherein said first control signal is derived from said first transformer secondary winding second terminal;

a second synchronous rectifier coupled to said first transformer secondary winding second terminal and having a control terminal floating relative to ground;

a second drive circuit coupled to said second synchronous rectifier floating control terminal and controlling said second synchronous rectifier; and a second control signal coupled to said second drive circuit, wherein said second control signal controls the second drive circuit as a function of a voltage polarity reversal across said first transformer.

2. The circuit of claim 1 wherein said first drive circuit comprises a first switch and a second switch, and wherein said second drive circuit comprises a third switch and a fourth switch.

3. The circuit of claim 2 wherein said first and third switches comprise N-type MOSFETs, said second and fourth switches comprise P-type MOSFETs, said first and second switches being connected in a totem pole arrangement, said third and fourth switches being connected in a totem pole arrangement, wherein said first and second synchronous rectifiers comprise MOSFET's, and said control terminals of said first and second synchronous rectifiers are gates.

4. The circuit of claim 2 wherein said first, second, third and fourth switches have gates, wherein said gates of said first and second switches are connected to said first transformer secondary winding second terminal, and wherein said gates of said third and fourth switches are connected to said first transformer secondary winding first terminal.

5. The circuit of claim 2, further comprising:

a first capacitor coupled across said first and second switch and connected to said first transformer secondary winding first terminal;

a first diode coupled between said first capacitor and said first synchronous rectifier;

a second capacitor coupled across said third and fourth switch and connected to said first transformer secondary winding second terminal; and a second diode coupled between said second capacitor and said second synchronous rectifier.

6. The circuit of claim 5 further comprising;

an output voltage terminal and a return voltage terminal;

a first inductor coupled between said first synchronous rectifier and said output voltage terminal; and a third capacitor coupled in parallel between said output voltage terminal and said return voltage terminal.

7. The circuit of claim 6 further comprising:

a second inductor coupled in series between said first inductor and said second synchronous rectifier.

8. The circuit of claim 7 further comprising:

a third inductor coupled in series between said first inductor and said output voltage terminal.

9. The circuit of claim 2 wherein said first transformer secondary winding further comprises a center tap, further comprising a return output voltage terminal connected to said center tap, wherein said first, second, third and fourth switches have gates, wherein said gates of said first and second switches are connected to said first transformer secondary winding second terminal, and wherein said gates of said third and fourth switches are connected to said first transformer secondary winding first terminal.

10. The circuit of claim 2 wherein said first transformer secondary winding further comprises a center tap, further comprising a return output voltage terminal connected to said center tap, wherein said first, second, third and fourth switches have gates, wherein said gate of said first switch is coupled to said first transformer second winding second terminal, said gate of said third switch is connected to said first transformer secondary winding first terminal, and said gates of said second and fourth switches are coupled to said first end of said first inductor.

11. The circuit of claim 5 wherein said first transformer secondary winding further comprises a center tap, said circuit further comprising:

a first inductor coupled to said center tap of said first transformer secondary winding;

an output voltage terminal coupled to said first and second diodes; and a third capacitor coupled in parallel with said output voltage terminal and said first inductor, wherein said gate of said first switch is coupled to said first transformer second winding second terminal, said gate of said third switch is connected to said first transformer secondary winding first terminal, and said gates of said second and fourth switches are coupled to said output voltage terminal.

12. The circuit of claim 4, further comprising:

a first capacitor having a first end and a second end, said first capacitor first end coupled to said first switch and said first capacitor second end coupled to said second switch;

a first diode having a first end and a second end, said first diode first end coupled to said gates of said first and second switches and said first diode second end coupled to said second switch;

a second capacitor having a first end and a second end, said second capacitor first end coupled to said third switch, said second capacitor second end coupled to said fourth switch; and a second diode having a first end and a second end, said second diode first end coupled to said gates of said third and fourth switches, said second diode second end coupled to said fourth switch.

13. The circuit of claim 2, further comprising:

a first capacitor having a first end and a second end, said first capacitor first end coupled to said first switch;

a first diode having a first end and a second end, said first diode first end coupled to said first capacitor second end;

a second capacitor having a first end and a second end, said second capacitor first end coupled to said third switch;

a second diode having a first end and a second end, said second diode first end coupled to said second capacitor second end;

a first current-limiting resistor having a first end and a second end, said first current-limiting resistor first end coupled to said first capacitor second end and said first diode first end, said first current-limiting resistor second end coupled to said second switch;

a second current-limiting resistor having a first end and a second end, said second current-limiting resistor first end coupled to said first diode second end, said second current-limiting resistor second end coupled to said first synchronous rectifier;

a third current-limiting resistor having a first end and a second end, said third current-limiting resistor first end coupled to said second capacitor second end and said second diode first end, said third current-limiting resistor second end coupled to said fourth switch; and a fourth current-limiting resistor having a first end and a second end, said fourth current-limiting resistor first end coupled to said second diode second end, said fourth current-limiting resistor second end coupled to said second synchronous rectifier.

14. The circuit of claim 13 further comprising:

a first voltage limiter having a gate coupled in series between said first synchronous rectifier and said first current-limiting resistor, said gate of said first voltage limiter coupled to a voltage source; and a second voltage limiter having a gate coupled in series between said second synchronous rectifier and said third current-limiting resistor, said gate of said second voltage limiter coupled to said voltage source, wherein said first and second voltage limiters provide gate voltage limiting.

15. The circuit of claim 14 wherein said first and second voltage limiters comprise MOSFETs.

16. The circuit of claim 9 further comprising:

a second inductor coupled in series between said first transformer secondary winding first terminal and said first synchronous rectifier; and a third inductor coupled in series between said first transformer secondary winding second terminal and said second synchronous rectifier.

17. The circuit of claim 16 wherein said second and third inductors are saturable inductors.

18. A self-driven synchronous rectifier circuit for a power converter, said circuit comprising:

a first transformer having a primary winding and a secondary winding said secondary winding having a first terminal and a second terminal;

a first synchronous rectifier coupled to said first transformer secondary winding first terminal and having a control terminal floating relative to ground;

a first drive circuit coupled to said first synchronous rectifier floating control terminal and controlling said first synchronous rectifier;

a first control signal coupled to said first drive circuit, wherein said first control signal controls the first drive circuit as a function of a voltage polarity reversal across said first transformer, wherein said first transformer has a center tap;

a second transformer having a primary winding and a secondary winding, said secondary winding having a first terminal, a second terminal and a center tap, wherein said first control signal comprises a signal from said second transformer secondary winding second terminal;

a second synchronous rectifier coupled to said first transformer secondary winding second terminal and having a control terminal floating relative to ground;

a second drive circuit coupled to said second synchronous rectifier control terminal and controlling said second synchronous rectifier; and a second control signal coupled to said second drive circuit, wherein said second control signal controls said second drive circuit as a function of a voltage polarity reversal across said second transformer.

19. The circuit of claim 18 wherein said second transformer comprises a signal transformer.

20. A method of rectifying a varying voltage from a power converter using a driven synchronous rectifier circuit with a first transformer having a primary winding and a secondary winding, said secondary winding having a first and second terminal, said method comprising the steps of:

providing the varying signal to said primary winding of said first transformer;

a first synchronous rectifier conducting current via said first transformer secondary winding, said first synchronous rectifier having a control terminal floating relative to ground;

a first drive circuit controlling said first synchronous rectifier;

a first control signal controlling said first drive circuit as a function of a voltage polarity reversal across said first transformer;

a second synchronous rectifier conducting current via said first transformer secondary winding, said second synchronous rectifier having a control terminal floating relative to ground;

a second drive circuit controlling said second synchronous rectifier; and a second control signal controlling said second drive circuit as a function of a voltage polarity reversal across said first transformer.

21. The method of claim 20 wherein said first control signal is a signal from said first transformer secondary winding second terminal.

22. The method of claim 21 wherein said second control signal is a signal from said first transformer secondary winding first terminal.

23. The method of claim 20 wherein said first and second synchronous rectifiers comprise MOSFET's having gates, wherein said gate of said first synchronous rectifier is controlled by said first drive circuit, and wherein said gate of said second synchronous rectifier is controlled by said second drive circuit.

24. The method of claim 20 wherein said first and second drive circuits comprise two switches, one of said switches being an N-type and the other said switch being a P-type.

25. The method of claim 20 wherein said first and second drive circuits float relative to ground via a floating supply voltage, wherein said floating supply voltage comprises a capacitor and a diode.

26. The method of claim 20 further comprising the steps of:

a first voltage limiter controlling said first synchronous rectifier; and a second voltage limiter controlling said second synchronous rectifier.

27. The method of claim 20 further comprising the steps of:

controlling multi-pulsing with a first inductor; and controlling multi-pulsing with a second inductor.

28. The method of claim 20 further comprising the steps of:

limiting a current of the first drive circuit with at least one first current-limiting resistor; and limiting a current of the second drive circuit with at least one second current-limiting resistor.

29. The method of claim 20 wherein said synchronous rectifier circuit further comprises a second transformer having a primary winding and a secondary winding, said secondary winding having a first terminal, a second terminal and a center tap, wherein said first control signal is a signal from said second transformer secondary winding second terminal.

* * * * *